(12) United States Patent
Coates

(10) Patent No.: US 6,779,925 B2
(45) Date of Patent: Aug. 24, 2004

(54) BEARING ASSEMBLY

(76) Inventor: George J. Coates, Rte. 34 & Ridgewood Rd., Wall, NJ (US) 07719

( * ) Notice: Subject to any disclaimer, the term of this patent is extended or adjusted under 35 U.S.C. 154(b) by 95 days.

(21) Appl. No.: 10/303,852

(22) Filed: Nov. 26, 2002

(65) Prior Publication Data
US 2004/0101219 A1 May 27, 2004

(51) Int. Cl.$^7$ ............................................. F16C 19/08
(52) U.S. Cl. ........................ 384/473; 384/540; 384/613
(58) Field of Search ............................... 384/473, 613, 384/540, 537, 584

(56) References Cited

U.S. PATENT DOCUMENTS 5,496,114 A * 3/1996 Lin ............................. 384/458
5,690,434 A * 11/1997 Beshoory et al. ........... 384/613
6,312,161 B1 * 11/2001 Williams ..................... 384/459

* cited by examiner

Primary Examiner—Lenard A. Footland
(74) Attorney, Agent, or Firm—Clifford G. Frayne

(57) ABSTRACT

A bearing assembly for a rotatable shaft, the bearing assembly having a bearing carrier housing, the housing having a fixed first end and a removably securable second end, the first and second ends having an aperture therethrough for passage of the rotatable shaft, there being packed within the housing a plurality of bearing elements, each bearing element having an inner race having an inner bearing surface dimensioned to the circumference of the rotatable shaft, and an outer race concentric with the inner race and separated therefrom by a plurality of rotatable bearing means positioned between said the race and the outer race, the inner race and the rotatable bearing means freely rotatable in relationship to the outer race and rotatable shaft.

4 Claims, 4 Drawing Sheets

BEARING ASSEMBLY

BACKGROUND OF THE INVENTION

1. Field of the Invention

The present invention relates to a bearing assembly which was developed for use for internal combustion engines of the split head variety, but could have application to any mechanical situation in which a rotating shaft requires a bearing mount.

2. Description of the Prior Art

In the mechanical arts where a rotating shaft is employed, be it either in the motor, pump, internal combustion engine or the like, the shaft must be supported and any such support must provide for a bearing surface in contact with the shaft so as to allow the shaft to freely rotate without wear or deterioration. Still further, the bearing assembly requires a source of lubrication. In some instances, such as wheel bearings, the bearings are packed with a lubricant. In other instances, such as a crank shaft on an internal combustion engine, bearing surfaces are in communication with the oil sump. In a conventional internal combustion engine of the poppet valve variety, the cam shaft would be lubricated from the oil sump.

The Applicant herein has directed considerable attention to the internal combustion engine of the piston/cylinder type, and in particular to the replacement of the poppet valve system, including the poppet valve, springs, mountings and associated cam shaft with a spherical rotary valve assembly for the introduction of the fuel/air mixture into the cylinder and for the evacuation of the exhaust gases.

Applicant is the named inventor in U.S. Pat. No. 4,989,576, "Internal Combustion Engine"; U.S. Pat. No. 4,944,261, "Spherical Rotary Valve Assembly for Internal Combustion Engine"; U.S. Pat. No. 4,953,527, "Spherical Rotary Valve Assembly for Internal Combustion Engine"; U.S. Pat. No. 4,976,232, "Valve Seal for Rotary Valve Engine"; U.S. Pat. No. 4,989,558, "Spherical Rotary Valve Assembly for Internal Combustion Engine"; U.S. Pat. No. 5,109,814, "Spherical Rotary Valve"; and U.S. Pat. No. 5,361,739, "Spherical Rotary Valve Assembly for Use in a Rotary Valve Internal Combustion Engine". The aforementioned U.S. Patents are incorporated herein as if set forth in length and in detail.

Applicant's spherical rotary intake valve and spherical rotary exhaust valve are mounted on rotating shafts within a split head assembly. Applicant's bearing assembly has been developed for the shaft upon which the spherical rotary intake and spherical rotary exhaust valves are mounted within his spherical rotary valve assembly, however, the bearing assembly could have equal application to any other mechanical situation which involves a rotating shaft and which would permit the positioning of Applicant's bearing assembly.

OBJECTS OF THE INVENTION

An object of the present invention is to provide for a novel bearing assembly which is pre-lubricated and which is secured within a housing.

Another object of the present invention is to provide for a novel bearing assembly which once pre-lubricated requires no further lubrication.

A further object of the present invention is to provide for a novel bearing assembly which is permanently lubricated.

A still further object of the present invention is to provide for a novel bearing assembly in which lubricant leakage is avoided.

SUMMARY OF THE INVENTION

A bearing assembly for a rotatable shaft means, the bearing assembly having a bearing carrier housing, the housing having a fixed first end and a removably securable second end, the first and second ends having an aperture therethrough for passage of the shaft, there being packed within the housing a plurality of bearing elements, each bearing element having an inner race having an inner bearing surface dimensioned to the circumference of the rotating shaft, and an outer race concentric with the inner race and separated therefrom by a plurality of rotatable bearing means positioned between the inner race and the outer race, the inner race and rotatable bearing means freely rotatable in relationship to the outer race and rotating shaft.

BRIEF DESCRIPTION OF THE DRAWINGS

These and other advantages will be evident, especially when taken in light of the following illustrations wherein.

DETAILED DESCRIPTION OF THE INVENTION

Figure 1:
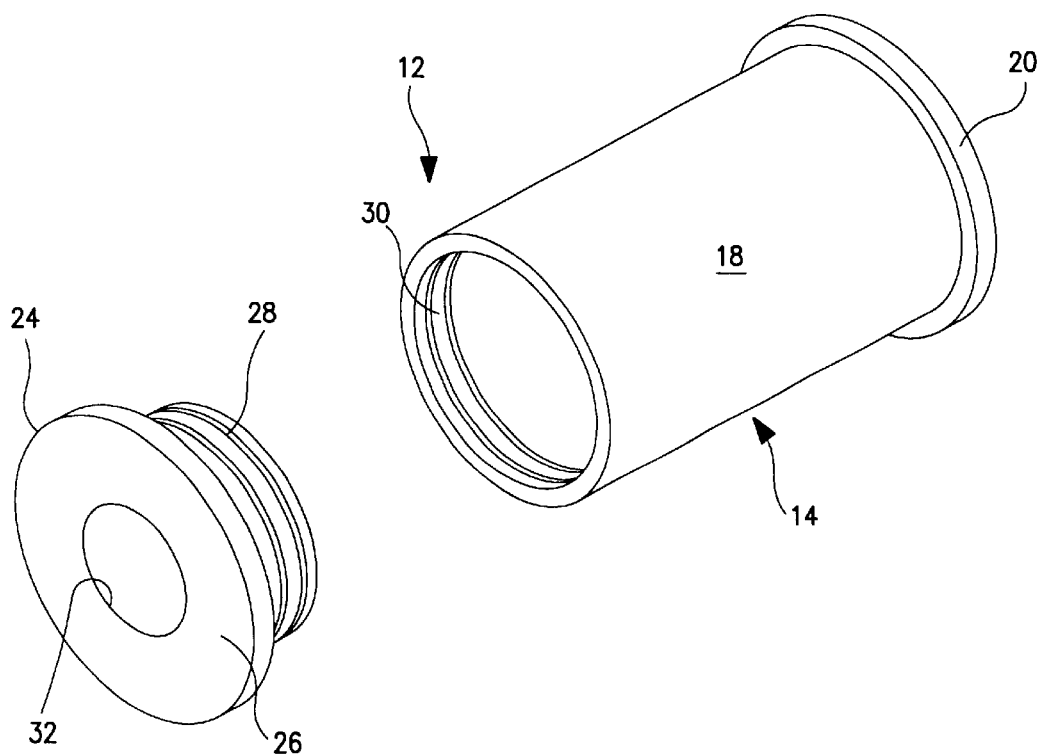
FIG. 1 is a perspective view of the bearing carrier housing of the bearing assembly of the present invention.
Figure 2:
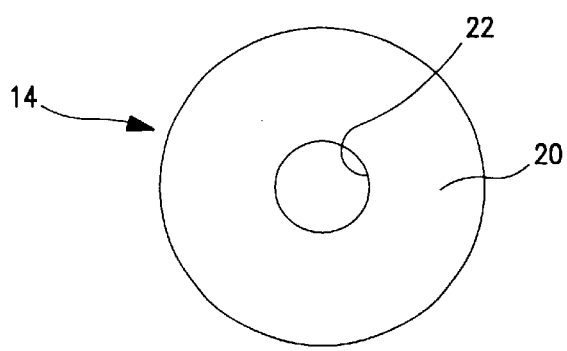
FIG. 2 is an end view of the bearing carrier housing of the present invention.

Referring to FIGS. 1 and 2 there is an end view and a perspective view of a bearing carrier housing member 12 within which is secured the bearings as described hereafter that constitute the bearing assembly 10. Bearing carrier housing member 12 has a cylindrical body member 14 having a circumferential wall 18. Cylindrical body member 14 is integrally formed with a first end member 20 having a centrally disposed aperture 22 therethrough.

Second end member 24 of bearing carrier housing 12 comprises a cap means 26 which is removably securable to the cylindrical body member 14. In this embodiment, cap means 26 is formed with external threads 28 cooperable with internal threads 30 on cylindrical body member 14 for threaded engagement therewith. Cap means 26 also has a centrally disposed aperture 32 which is in alignment with aperture 22 on first end member 20 when cap means 26 is secured to cylindrical body member 14.

Figure 3:
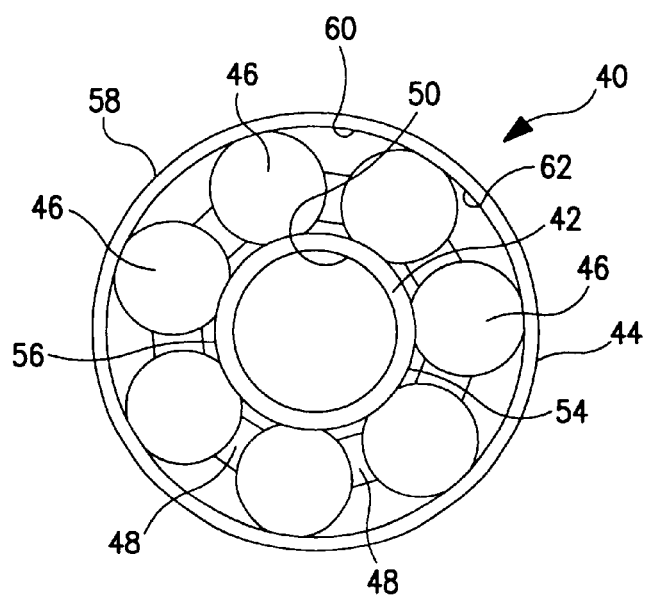
FIG. 3 is a side view of the bearing element of the present invention.
Figure 4:
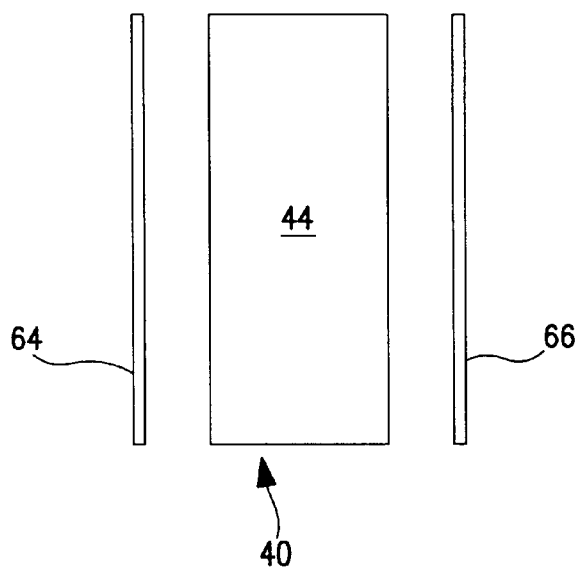
FIG. 4 is an exploded end view of the bearing element of the present invention.

FIGS. 3 and 4 are a side view and exploded end view of a bearing element 40, one or more of which are secured within bearing carrier housing member 12. Bearing element 40 has an inner race 42 and an outer race 44 there being disposed between inner race and outer race 42 and 44 a plurality of bearings 46 disposed within a bearing cage 48.

Figure 6:
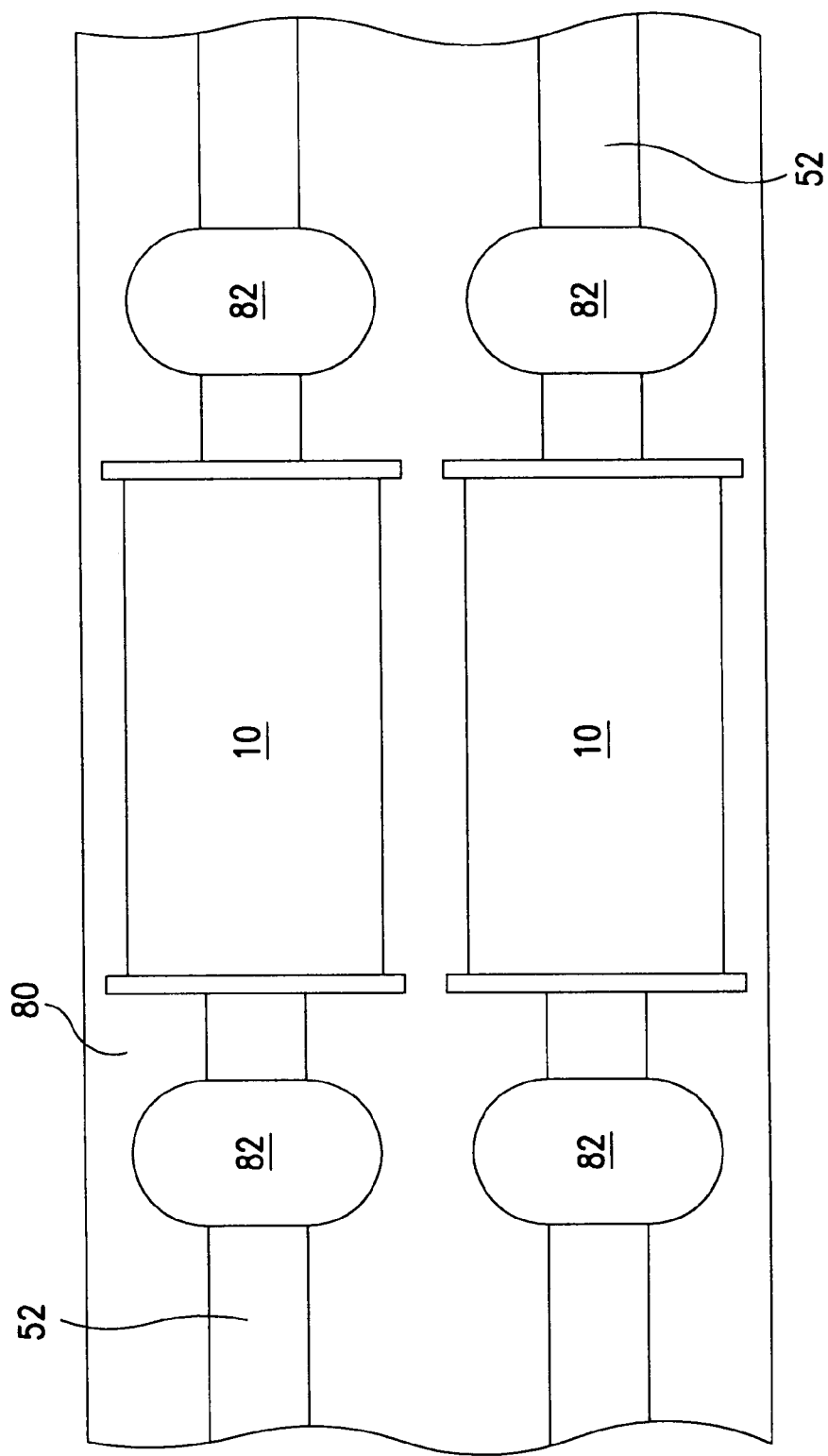
FIG. 6 is a partial top view of the bearing assembly of the present invention positioned within the lower head of a split head of an internal combustion engine employing a spherical rotary valve assembly.

Inner race 42 has an inner surface 50 which would be in contact with the rotatable shaft 52 (see FIG. 6) which would pass therethrough. Inner race 42's outer surface 54 would have a circumferential groove 56 within which the bearings 46 would ride.

Outer race 44 has an outer surface 58 and an inner surface 60 having a groove 62 within which the bearings 46 would ride. In the embodiment illustrated, the bearings 46 are ball bearings, but roller bearings or needle bearings could also be utilized with the attendant change in the cross section of grooves 56 and 62 in the inner race and outer race of 42 and 44 respectively. In operation, the bearing element 40 would be fabricated, packed with grease between the outer surface 54 of inner race 42 and the inner surface 60 of outer race 44. Side-wall members 64 and 66 having apertures 68 and 70 coincidental with the dimension of the diameter of inner race 42 would then be affixed so as to encapsulate the grease, bearings 46 and bearing cage 48 between the side walls, the outer surface 54 of inner race 42 and the inner surface 60 of outer race 44. Similar bearing elements 40 would be prepared in a like manner depending on the size of the bearing carrier housing member 12.

Figure 5:
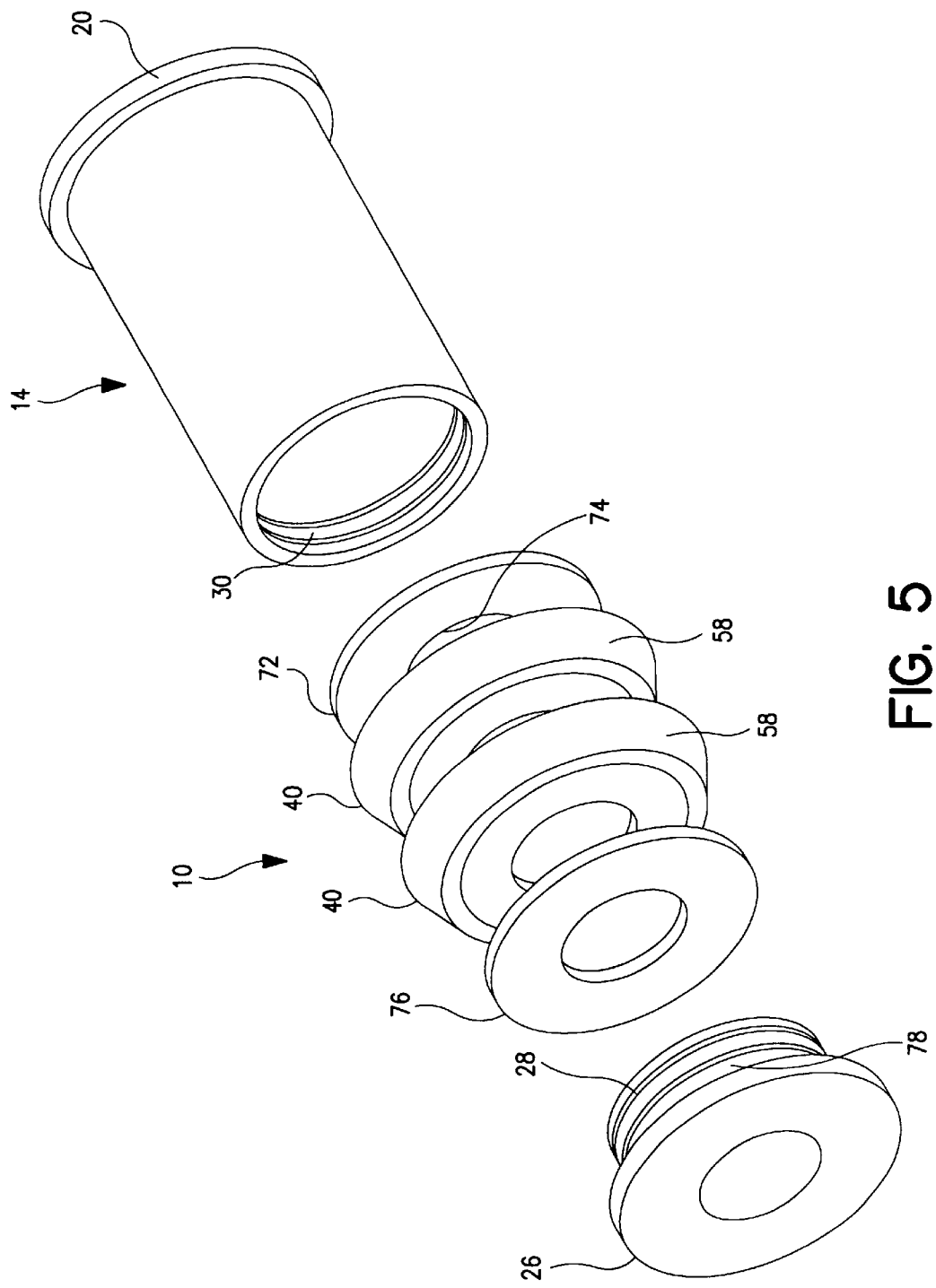
FIG. 5 is an exploded perspective view of the bearing element of the present invention.

In assembling bearing assembly 10 as illustrated in FIG. 5, a ceramic heat shield 72 having an aperture 74 complimentary with aperture 22 in first end member 20 of bearing carrier housing member 12 would be positioned within the bearing carrier housing member 12. Bearing elements 40 would then be pressure fit into the bearing carrier housing member 12. The number of bearing elements 40 would vary depending upon the size of the bearing carrier housing member 12. The outer dimension of the outer race 44 is such that the bearing elements are packed into the bearing carrier housing member 12 such that the outer surface 58 of outer race 44 is frictionally engaged with the inner surface of cylindrical body member 14. A second ceramic heat shield 76 is the last element to be secured within cylindrical body member 14. Cap means 26 is then fitted with a seal 78 proximate to and about external threads 28 and is then secured to the cylindrical body member 14.

One or more of the bearing assembly 10 would then be fitted on the rotatable shaft 52. The various bearing assemblies 10 and rotatable shaft 52 would then be positioned on the mounting element 80, which as illustrated is the lower element of a split head of an internal combustion engine utilizing spherical rotary valves 82. The valves and the bearing assembly would be positioned in cavities conforming to one half their circumference and would be fully encapsulated when the upper element (not shown) is secured to the lower element 80.

In operation, the rotatable shaft 52 would be driven by any suitable means and would rotate within the bearing assembly 10. Within bearing assembly 10, the inner race 42, the bearings 46 and the bearing cage 48 would be free to rotate in response to the rotation of rotatable shaft 52. The outer race 44 would remain in fixed relationship with respect to the cylindrical body member 14. In this construction, the bearing assembly has been pre-lubricated and sealed such that it is permanently lubricated and the lubricant is contained within each individual bearing element 40 and is not subject to leakage.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A bearing assembly comprising:

a housing member formed of a cylindrical body member having a fixed first end and a removably securable second end, said second end comprising a cap member, said fixed first end and said removably securable second end each having an aligned aperture therethrough for accommodation of a rotating shaft means;

a plurality of bearing elements packed within said housing, each of said bearing elements comprised of a circular, rotatable inner race, said inner race having an inner surface and an outer surface, said inner surface dimensioned to a circumference of said rotating shaft means, an outer race, and a plurality of bearings and bearing cages rotatably disposed between said inner race and said outer race, each of said bearing elements having sealable side walls maintaining permanent lubrication therebetween.

2. The bearing assembly in accordance with claim 1 wherein said cylindrical body member of said housing member and said removably securable second end, are threadedly fastened.

3. The bearing assembly in accordance with claim 1 wherein said outer race of said plurality of bearing elements has a diameter substantially identical to said cylindrical body member thereby frictionally engaging with said inner surface of said cylindrical body member and preventing the rotation of said outer race relative to said bearings and said bearing cages and said inner race.

4. The bearing assembly in accordance with claim 1 wherein a ceramic heat shield is juxtaposed said fixed first end of said cylindrical body member and said removably securable second end when said second end is secured to said cylindrical body member, therebeing disposed between said ceramic heat shield, said plurality of bearing elements.

* * * * *